United States Patent
Tate et al.

(10) Patent No.: US 11,111,958 B1
(45) Date of Patent: Sep. 7, 2021

(54) HYDRODYNAMIC BEARING

(71) Applicant: SCHAEFFLER TECHNOLOGIES AG & CO. KG, Herzogenaurach (DE)

(72) Inventors: John Tate, Cornelius, NC (US); James Brown, Rock Hill, SC (US); Ryan Carlino, Charlotte, NC (US); Arjun Kailassh Magalingam Adithyan, Charlotte, NC (US); Charles Schwab, Fort Mill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/807,882

(22) Filed: Mar. 3, 2020

(51) Int. Cl.
*F16C 33/10* (2006.01)
*F16C 17/10* (2006.01)
*F16C 17/02* (2006.01)
*F16C 17/04* (2006.01)

(52) U.S. Cl.
CPC ........ *F16C 33/1075* (2013.01); *F16C 17/028* (2013.01); *F16C 17/047* (2013.01); *F16C 17/10* (2013.01); *F16C 33/1065* (2013.01)

(58) Field of Classification Search
CPC ...... F16C 17/028; F16C 17/047; F16C 17/10; F16C 17/102; F16C 17/107; F16C 33/1065; F16C 33/1075
See application file for complete search history.

(56) References Cited

U.S. PATENT DOCUMENTS

| | | | | |
|---|---|---|---|---|
| 3,433,542 A | * | 3/1969 | Okano | F16C 33/1075 384/287 |
| 4,326,758 A | | 4/1982 | Nozue et al. | |
| 5,529,399 A | * | 6/1996 | Holze | F16C 33/1075 384/107 |
| 6,045,266 A | * | 4/2000 | Mitsubori | F02C 6/12 384/123 |
| 6,709,160 B1 | * | 3/2004 | Ward | F01D 25/166 384/286 |
| 6,929,402 B1 | * | 8/2005 | Titus | F16C 17/10 384/107 |
| 9,574,458 B1 | * | 2/2017 | Moscetti | F16C 17/047 |

(Continued)

FOREIGN PATENT DOCUMENTS

JP     06200940     * 7/1994   ............ F16C 17/047

OTHER PUBLICATIONS

Machine Translation of JP 06200940 (Year: 1994).*

*Primary Examiner* — Alan B Waits (74) *Attorney, Agent, or Firm* — Dickinson Wright PLLC (57) ABSTRACT

A hydrodynamic bearing includes an annular washer having an annular face configured to form a hydrodynamic thrust bearing. The annular face defines a plurality of circumferentially spaced oil grooves having opposing first and second lips extending between inner and outer diameters of the face. The annular face further defines a plurality of circumferentially spaced thrust segments alternating with the grooves such that each of the thrust segments is disposed between an associated pair of first and second ones of the grooves. Each of the thrust segments includes a land that is raised on the face relative to the first and second lips of the associated pair, a first ramp extending from the second lip of the first groove to a first side of the land, and a second ramp extending from the first lip of the second groove to a second side of the land.

20 Claims, 4 Drawing Sheets (56) References Cited

U.S. PATENT DOCUMENTS

| | | | |
|---|---|---|---|
| 9,664,229 B2* | 5/2017 | Murrish | F16C 33/1075 |
| 2008/0232729 A1* | 9/2008 | Petitjean | F01D 25/16 |
| | | | 384/284 |
| 2011/0176907 A1* | 7/2011 | Groves | F16C 33/1065 |
| | | | 415/1 |
| 2012/0080230 A1* | 4/2012 | Flores | F16C 43/04 |
| | | | 175/57 |
| 2017/0292592 A1* | 10/2017 | Hague | F16C 17/045 |
| 2020/0200218 A1* | 6/2020 | Arasaki | F16C 17/04 |

\* cited by examiner

HYDRODYNAMIC BEARING

TECHNICAL FIELD

The present disclosure relates to hydrodynamic bearings.

BACKGROUND

A bearing is a device that reduces friction between components having relative movement. Two main categories of bearings are thrust bearings and radial bearings. Thrust bearings are typically used to restrain axial movement of one or more components while reducing friction between surfaces, whereas radial bearings typically support a component for rotation. Thrust bearings and radial bearings may be of the hydrodynamic type. A hydrodynamic bearing utilizes oil to form a load-carrying film that separates the two surfaces rotating relative to each other.

SUMMARY

According to one embodiment, a hydrodynamic bearing includes an axially extending sleeve defining a central bore and an annular washer extending radially outward from the sleeve. The washer has an annular bearing face that defines a plurality of circumferentially spaced oil grooves each having opposing first and second lips extending between inner and outer diameters of the washer. The bearing face further defines a plurality of circumferentially spaced thrust segments arranged about the washer in alternating arrangement with the grooves such that each of the thrust segments is disposed between an associated pair of first and second ones of the grooves. The thrust segments are bi-directionally ramped and configured carry a wedge-shaped thrust-load oil film. Each of the thrust segments includes a land that is raised on the bearing face relative to the first and second lips of the associated pair, the land having first and second opposing sides, a first ramp extending from the second lip of the first groove to the first side of the land, and a second ramp extending from the first lip of the second groove to the second side of the land.

According to another embodiment, a hydrodynamic bearing includes an axially extending sleeve defining a central bore and an annular washer extending radially outward from the sleeve. The washer has an annular bearing face that defines a plurality of circumferentially spaced oil grooves extending between inner and outer diameters of the face. The bearing face further defines a plurality of circumferentially spaced lands that are each circumferentially disposed between a pair of the grooves and a plurality of first ramps. Each first ramp extends from a corresponding one of the grooves to a corresponding one of the lands. Each of the first ramps slopes outwardly from the corresponding one of the grooves to the corresponding one of the lands. The bearing face also defines a plurality of second ramps that each extend from a corresponding one of the grooves to a corresponding one of the lands. Each of the second ramps slopes outwardly from the corresponding one of the grooves to the corresponding one of the lands.

According to yet another embodiment, a hydrodynamic bearing includes an annular washer having an annular face configured to form a hydrodynamic thrust bearing. The annular face defines a plurality of circumferentially spaced oil grooves having opposing first and second lips extending between inner and outer diameters of the face. The annular face further defines a plurality of circumferentially spaced thrust segments alternating with the grooves such that each of the thrust segments is disposed between an associated pair of first and second ones of the grooves. Each of the thrust segments includes a land that is raised on the face relative to the first and second lips of the associated pair, a first ramp extending from the second lip of the first groove to a first side of the land, and a second ramp extending from the first lip of the second groove to a second side of the land.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made.

Figures 1, 2:
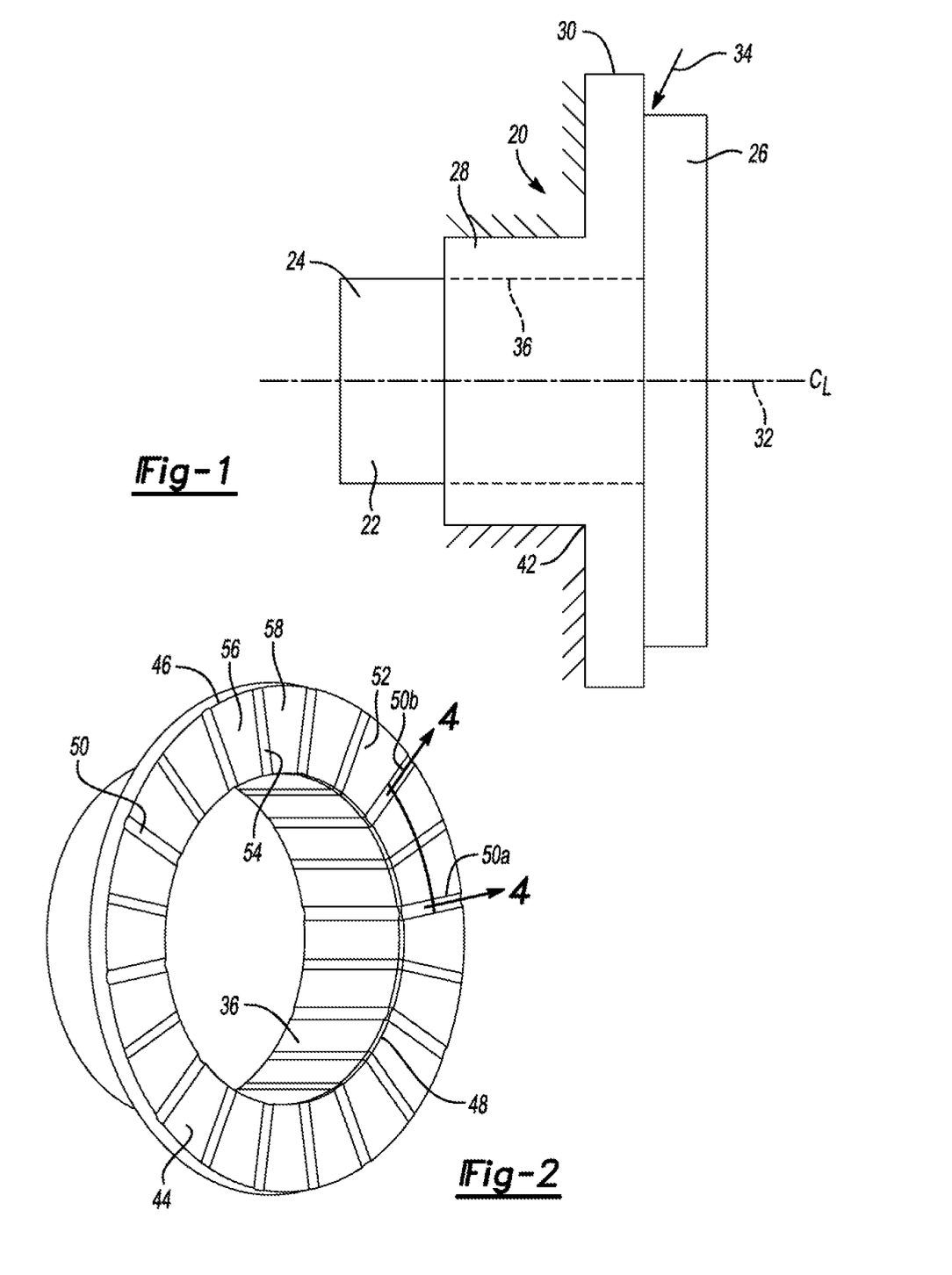
FIG. 1 is a diagrammatical side view of a hydrodynamic bearing supporting a shaft.
FIG. 2 is a front perspective view of a hydrodynamic bearing.

Referring to FIG. 1, a hydrodynamic bearing 20 supports a rotary member 22. The bearing 20 may be fixed to a housing or other structure. The bearing 20 may be a combination thrust (axial) and radial bearing with hydrodynamic features for supporting both thrust (axial) and radial loads. In other embodiments, the hydrodynamic bearing 20 may be only a thrust bearing or only a radial bearing. The rotary member 22 includes a shaft 24 and a flange 26. The shaft 24 extends through the bearing 20. The bearing 20 includes a sleeve 28 that radially supports the shaft 24 for rotation about the centerline 32 and an annular washer 30 that supports thrust loads of the flange 26. The bearing 20 and the rotary member 22 may be concentric with each other and centered on the centerline 32 or may be offset from the centerline 32. The sleeve 28 and the washer 30 may be integrally formed as a solid body. The bearing 20 may be formed of plastic.

The hydrodynamic bearing 20 is configured to create a load-carrying oil film between the washer 30 and the flange 26 and between the sleeve 28 and the shaft 24. During rotational operation, oil 34 is fed into the contact between washer 30 and flange 26 to create a wedge-shaped thrust-load carrying oil film. Oil is also fed into the contact between shaft 24 and sleeve 28 to create a wedge-shaped radial-load oil film.

Figure 3:
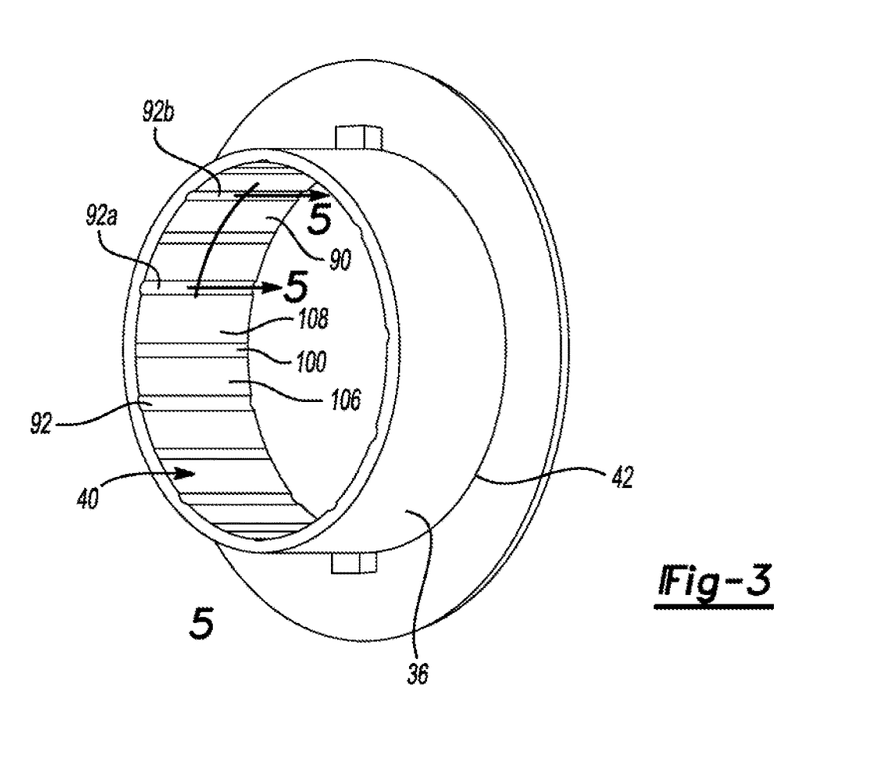
FIG. 3 is a back perspective view of the hydrodynamic bearing of FIG. 2.

Referring to FIGS. 1, 2, and 3, the sleeve 28 extends axially and has an inner diameter 36 that defines a central bore 40 sized to receive the shaft 24. The annular washer 30 may be centered on the centerline 32 and extends radially outward from an end 42 of the sleeve 28. The annular washer 30 has an annular bearing face 44 configured to form a hydrodynamic thrust bearing. The bearing face 44 has an outer diameter 46 and an inner diameter 48. The inner diameter 48 may be continuous with the inner diameter 36 of the sleeve 28, or a transition may be present. The bearing face 44 may be an axial face that is oriented radially, i.e., perpendicular, to the centerline 32. The bearing face 44 defines a plurality of oil grooves 50. The grooves 50 are circumferentially spaced around the face 44 and may be equally spaced relative to each other. The face 44 is shown with ten grooves, but the number may vary depending upon the specific requirements of the bearing 20. The grooves 50 extend radially across the face 44. The grooves 50 may extend partially or may extend completely from the outer diameter 46 to the inner diameter 48. The face 44 further defines a plurality of circumferentially spaced thrust segments 52 alternating with the grooves 50 such that each of the thrust segments 52 is disposed between an associated pair of first and second ones of the grooves 50, e.g., grooves 50a and 50b. The thrust segments 52 are bi-directionally ramped and configured carry a wedge-shaped thrust-load oil film in both rotational directions of the rotary member 22.

Figure 4:
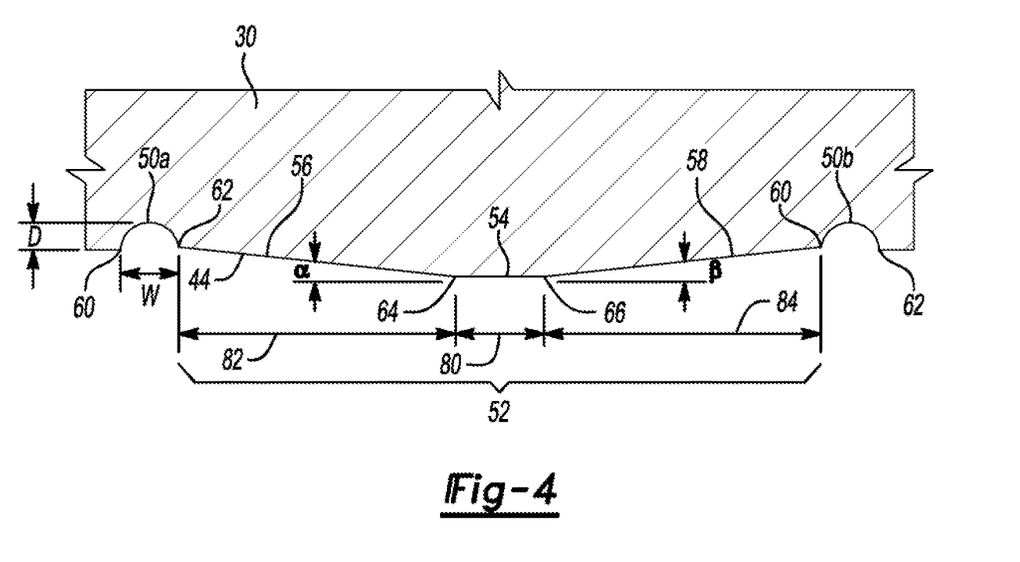
FIG. 4 is section view of the hydrodynamic bearing along cutline 4-4.

Referring to FIGS. 2 and 4, the grooves 50 have opposing lips 60, 62 that may extend radially between the inner and outer diameters of the face 44. Each thrust segment 52 includes a land 54, a first ramp 56, and a second ramp 58. The land 54 is flat and represents the highest point of the face 44. That is, the land 54 is raised on the bearing face 44 relative to the first and second lips 60, 62. The ramp 56 extends from the lip 62 of the groove 50a to a first side 64 of the land 54. The other ramp 58 extends from the lip 60 of the groove 50b to a second side 66 of the land 54. The ramps 56, 58 extend and slope from their lowest positions at the lips 60, 62 to their highest positions at the land 54. The ramps 56, 58 slope in opposite directions making the thrust segments 52 bi-directional. That is, the ramps 58 are sloped outwardly in the clockwise direction of the washer 30 and the ramps 56 are sloped outwardly in the counterclockwise direction of the washer 30.

The bi-directional thrust segments 52 allow the bearing 20 to be functional for both rotational directions of the rotary member 22. The ramps 58 and the lands 54 cooperate to provide a wedge-shaped thrust-load oil film when the flange 26 rotates clockwise, and the ramps 56 and the lands 54 cooperate to provide a wedge-shaped thrust-load oil film when the flange 26 rotates counterclockwise.

The grooves 50 each have a circumferential width (W) measured between the lips 60 and 62, and a depth (D). The depth D is measured at the deepest point of the groove. The land 54 has first circumferential length 80 measured between the first and second sides 64, 66. The first ramp 56 has a circumferential length 82 measured between the second lip 62 and the first side 64. The second ramp 58 has a circumferential length 84 measured between the first lip 60 and the second side 66. (When comparing the width W and the lengths 80, 82, 84 the measurements should be at a same radial position of the face 44.)

In the illustrated embodiment, the ramps 56 and 58 are circumferentially longer than the land 54, and the ramps 56, 58 are the same length. In other embodiments, however, the lands 54 can be longer than the ramps 56, 58 and/or the ramps may be of different lengths. The relative dimensions of the components of the thrust segments 52 can be tuned to provide optimum performance for particular applications. According to one or more embodiments, the ratio between the length 80 of the land 54 and the length(s) 82, 84, or both is between 1:1 to 1:5; the ratio between the width W of the groove 50 and the length(s) 82, 84, or both is between 1:1 to 1:15; and the depth D is between 0.025 to 1.5 millimeters (mm). The angles Alpha and Beta may be between 0.25 to 3 degrees. These relative lengths, the depth D, and the angles are of course merely examples and may vary according to application of the bearing 20.

Figure 5:
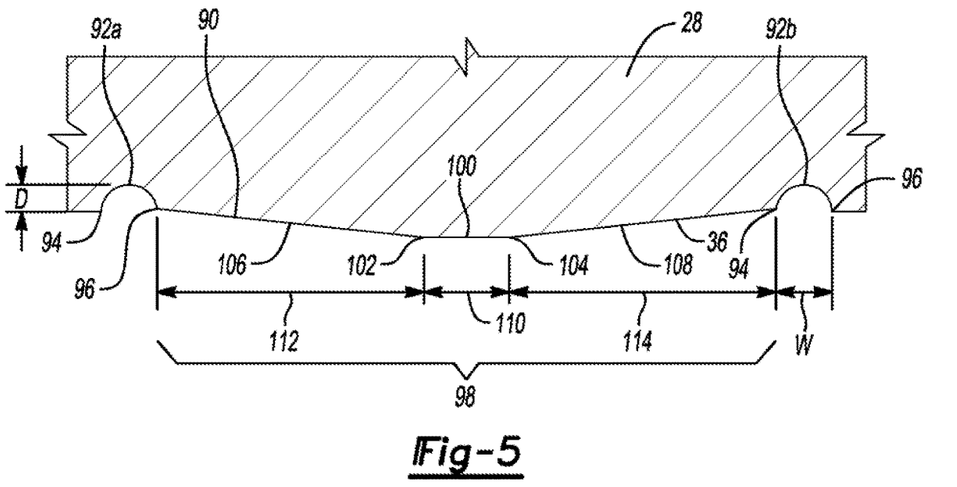
FIG. 5 is section view of the hydrodynamic bearing along cutline 5-5.

Referring to FIGS. 3 and 5, the inner diameter 36 of the sleeve 28 may form a bearing surface 90 configured to create a wedge-shaped radial-load oil film for supporting the shaft 24 for rotation within the bearing 20. The bearing surface 90 defines a plurality of circumferentially spaced oil channels 92 having opposing first and second lips 94, 96 extending axially. (The terms grooves and channels are used for reader convenience and does not necessarily denote any structural differences beyond those explicitly described.) The bearing surface 90 also defines a plurality of circumferentially spaced radial-bearing segments 98 alternating with the channels 92 such that each of the radial-bearing segments 98 is disposed between an associated pair of first and second ones of the channels 92. The radial-bearing segments 98 may also be bi-directionally ramped and configured to carry the wedge-shaped radial-load oil film in both directions.

The radial-bearing segments 98 may be the same or similar to the bearing segments 52. Each segment 98 may include a land 100 having first and second opposing sides 102, 104 and being raised on the bearing surface 90 relative to the first and second lips 94, 96 of the associated pair of channels. A first ramp 106 extends from the second lip 96 of the first channel 92a to the first side 102 of the land 100, and a second ramp 108 extends from the first lip 94 of the second channel 92b to the second side 104 of the land 100. The ramps 106, 108 slope in opposite directions making the bearing segments 98 bi-directional. That is, the ramps 106 are sloped outwardly in the clockwise direction and the ramps 108 are sloped outwardly in the counterlockwise direction.

The bi-directional radial-bearing segments 98 allow the bearing surface 90 to be functional for both rotational directions of the shaft 24. The ramps 106 and the lands 100 cooperate to provide a wedge-shaped radial-load oil film when the shaft 24 rotates clockwise, and the ramps 108 and the lands 100 cooperate to provide a wedge-shaped radial-load oil film when the shaft 24 rotates counterclockwise.

The channels 92 each have a circumferential width (W) measured between the lips 94 and 96, and a depth (D). The depth D is measured at the deepest point of the channel 92.

The land 100 has first circumferential length 10 measured between the first and second sides 102, 104. The first ramp 106 has a circumferential length 112 measured between the second lip 96 and the first side 102. The second ramp 108 has a circumferential length 114 measured between the first lip 94 and the second side 104. In the illustrated embodiment, the ramps 106 and 108 are circumferentially longer than the land 100, and the ramps 106, 108 are the same length. In other embodiments, however, the land 100 can be longer than the ramps 106, 108 and/or the ramps 106, 108 may have different lengths. The relative dimensions of the components of the thrust segments 98 can be tuned to provide particular properties suitable for particular applications.

The radial-bearing segment 98 may be the same as the thrust segments 52, i.e., have the above-described relative dimensions. Or, the radial-bearing segments 98 may have different dimensions than the thrust segments 52 to account for the differences between axial and radial loads of the rotary member 22.

Figure 6:
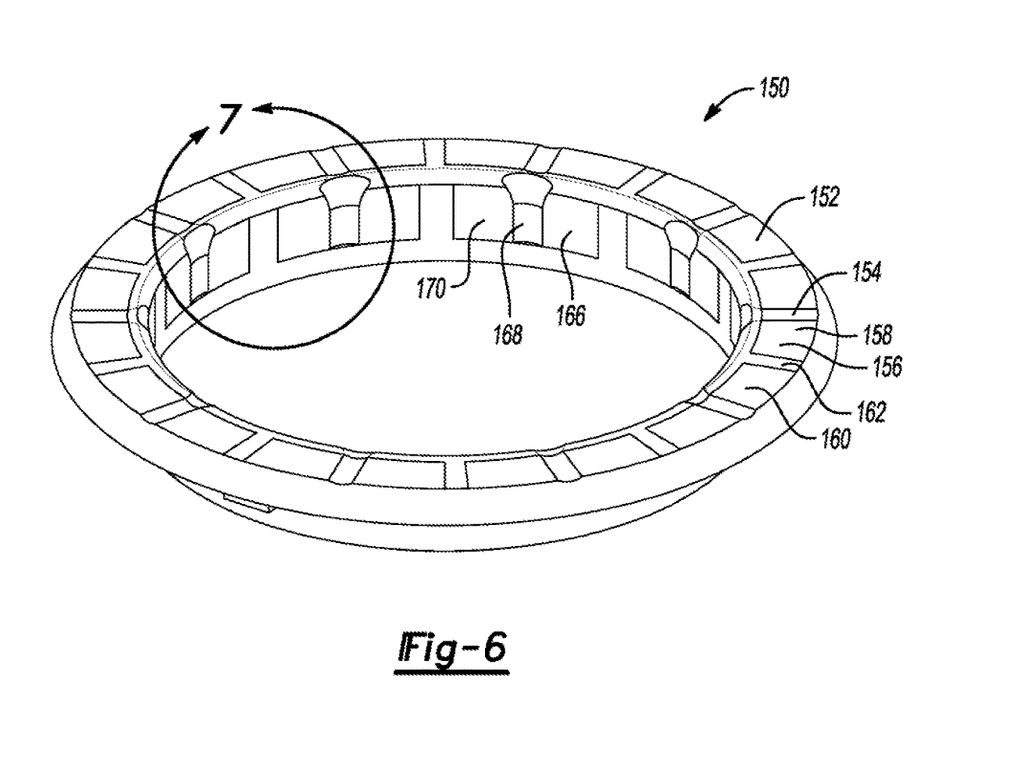
FIG. 6 is a perspective view of a hydrodynamic bearing according to an alternative embodiment.
Figure 7:
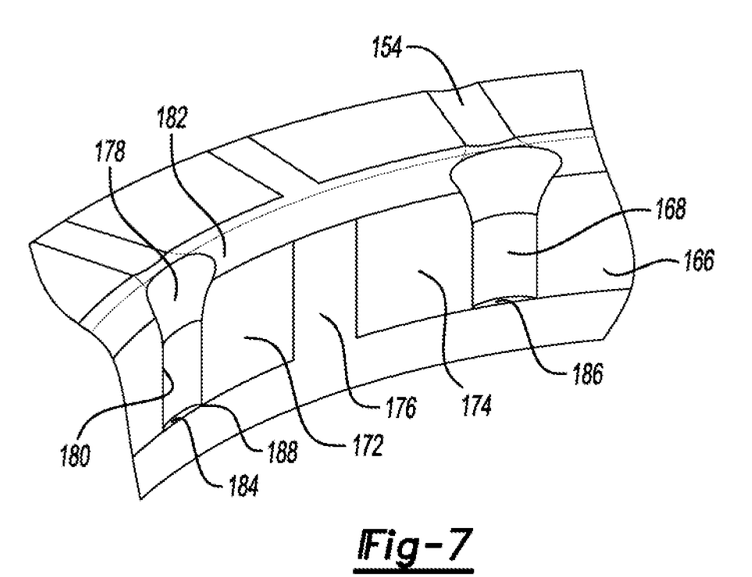
FIG. 7 is a detail view of a portion of the hydrodynamic bearing of FIG. 6.

Referring to FIGS. 6 and 7, another hydrodynamic bearing 150 may have both thrust and radial bearing faces. The thrust face 152 has a plurality of oil grooves 154 and thrust segments 156 between the grooves. Each thrust segment 156 has a pair of ramps 158, 160 and a land 162. The radial-bearing face 166 has a plurality of oil channels 168 and radial-bearing segments 170 between the channels 168. Each segment 170 has a pair of ramps 172, 174 and a land 176.

The grooves 154 and the channels 168 may be circumferentially aligned and may have different shapes, dimensions, or both. The channels 168 may be wider than the grooves 154. The channels 168 may include a bulbous portion 178 and a straight-walled portion 180. The bulbous portion 178 may be at the transition 182 between the thrust 152 and radial bearing faces 166. The channels 168 may include dams 184. The dams 184 may be a raised wall 186 that encloses one end 188 of the channels 168. The bulbous portions 178 increases the flow of oil from the grooves 154 to the channels 168, and the dams 184 restrict the flow of oil out of the channels 168 to ensure a sufficient amount of oil is stored within the channels 168.

While the above-described bearings are shown having both radial and thrust bearing faces, the bearings may include only a radial bearing face or only an axial bearing face in other embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST hydrodynamic bearing 20
rotary member 22
shaft 24
flange 26
sleeve 28
annular washer 30
centerline 32
oil 34
inner diameter 36
central bore 40
end 42
bearing face 44
outer diameter 46
inner diameter 48
oil grooves 50
thrust segments 52
lands 54
ramps 56
ramps 58
lips 60
lips 62
first side 64
second side 66
length 80
length 82
length 84
bearing surface 90
oil channels 92
lips 94
lips 96
radial-bearing segment 98
lands 100
first side 102
second side 104
ramps 106
ramps 108
circumferential length 110
circumferential length 112
circumferential length 114
hydrodynamic bearing 150
thrust face 152
oil grooves 154
thrust segments 156
ramps 158
ramps 160
lands 162
radial face 166
oil channels 168
radial-bearing segments 170
ramps 172
ramps 174
lands 176
bulbous portion 178 straight-walled portion 180
transition 182
dam 184
wall 186
end 188

What is claimed is:

1. A hydrodynamic bearing comprising:
an annular washer portion; and
a sleeve portion extending axially from the washer portion and having a bearing surface forming a periphery of a central bore of the bearing, the bearing surface defining a plurality of circumferentially spaced oil channels extending axially along the sleeve portion, each of the oil channels having a bulbous portion located at a transition between the washer portion and the sleeve portion and configured to receive oil, a straight-walled portion having a first end joined to the bulbous portion, and a dam extending transversely across a second end of the straight-walled portion to retain the oil.

2. The bearing of claim 1, wherein the annular washer portion defines a plurality of circumferentially arranged oil grooves that interconnect with the bulbous portions.

3. The bearing of claim 2, wherein the annular washer portion further defines a plurality of circumferentially spaced thrust segments alternating with the grooves such that each of the thrust segments is disposed between an associated pair of the grooves.

4. A hydrodynamic bearing comprising:
an axially extending sleeve defining a central bore, the sleeve having a radial bearing surface forming a periphery of the central bore, the radial bearing surface defining:
  a plurality of circumferentially spaced oil channels extending axially through a portion of the sleeve, each of the oil channels having an open end configured to receive oil and a closed end having a dam configured to retain the oil within the oil channels,
  a plurality of circumferentially spaced lands, each being circumferentially disposed between a pair of the channels,
  a plurality of first ramps, each extending from a corresponding one of the channels to a corresponding one of the lands of the radial bearing surface, wherein each of the first ramps of the radial bearing surface slopes outwardly from the corresponding one of the channels to the corresponding one of the land of the radial bearing surface, and
  a plurality of second ramps, each extending from a corresponding one of the channels to a corresponding one of the land of the radial bearing surface, wherein each of the second ramps slopes outwardly from the corresponding one of the channels to the corresponding one of the land of the radial bearing surface; and
an annular washer extending radially outward from the sleeve, the washer having an annular bearing face defining:
  a plurality of circumferentially spaced oil grooves extending between inner and outer diameters of the face and in fluid communication with the oil channels,
  a plurality of circumferentially spaced lands, each being circumferentially disposed between a pair of the grooves,
  a plurality of first ramps, each extending from a corresponding one of the grooves to a corresponding one of the lands, wherein each of the first ramps slopes outwardly from the corresponding one of the grooves to the corresponding one of the lands, and
  a plurality of second ramps, each extending from a corresponding one of the grooves to a corresponding one of the lands, wherein each of the second ramps slopes outwardly from the corresponding one of the grooves to the corresponding one of the lands.

5. The bearing of claim 4, wherein each of the dams includes a wall oriented radially relative to a centerline of the central bore and extending between opposing lips of the channels.

6. A hydrodynamic bearing comprising:
an axially extending sleeve defining a central bore; and
an annular washer extending radially outward from the sleeve, the washer having an annular hydrodynamic bearing face defining a plurality of circumferentially spaced oil grooves each having opposing first and second lips extending between inner and outer diameters of the washer, and plurality of circumferentially spaced thrust segments arranged about the washer in alternating arrangement with the grooves such that each of the thrust segments is disposed between an associated pair of the grooves, the thrust segments being bi-directionally ramped and configured carry a wedge-shaped thrust-load oil film; wherein
the sleeve has a hydrodynamic bearing surface forming a periphery of the central bore, the bearing a surface defining a plurality of circumferentially paced oil channels having opposing first and second axially extending lips and being aligned with the oil grooves of the washer, each of the oil channels having an open end configured to receive oil from a corresponding one of the oil grooves and a closed end defining a dam configured to retain the oil, the bearing surface further defining a plurality of circumferentially spaced radial-bearing segments alternating with the channels such that each of the radial-bearing segments is disposed between an associated pair of the channels, the radial-bearing segments being bi-directionally ramped and configured carry a wedge-shaped radial-load oil film.

7. The bearing of claim 6, wherein, each of the thrust segments includes a land that is raised on the bearing face relative to the first and second lips of the associated pair, the land having first and second opposing sides, a first ramp extending from the second lip of the first groove to the first side of the land, and a second ram extending from the first lip of the second groove to the second side of the land.

8. The bearing of claim 7, wherein the land has a first circumferential length measured between the first and second sides, the first ramp has a second circumferential length measured between the second lip and the first side of the land, and the second ramp has a third circumferential length measured between the first lip and the second side of the land, and wherein the first length of the land is less than the second length of the first ramp.

9. The bearing of claim 8, wherein the first length of the land is less than the third length of the second ramp.

10. The bearing of claim 9, wherein the second length of the first ramp is equal to the third length of the second ramp.

11. The bearing of claim 8, wherein a ratio of the first length of the land to the second length of the first ramp is between 1:1 and 1:5.

12. The bearing of claim 8, wherein each of the oil grooves has a circumferential width measured between the first and second lips and wherein a ratio of the width to the second length of the first ramp is between 1:1 and 1:15.

13. The bearing of claim 6, wherein each of the oil grooves has a depth between 0.025 to 1.5 millimeters.

14. The bearing of claim 6, wherein the sleeve and the washer are integrally formed.

15. The bearing of claim 6, wherein the washer is formed of plastic.

16. The bearing of claim 6, wherein each of the radial-bearing segments includes:
   a land having first and second opposing sides and being raised on the bearing surface relative to the first and second lips of the associated pair of channels,
   a first ramp extending from the second lip of the first channel to the first side of the land, and
   a second ramp extending from the first lip of the second channel to the second side of the land.

17. The bearing of claim 16, wherein, for the radial-bearing segment, the land has a fourth circumferential length measured between the first and second sides, first ramp has a fifth circumferential length measured between the second lip of the first channel and the first side of the land, and the second ramp has a sixth circumferential length measured between the first lip of the second channel and the second side of the land.

18. The bearing of claim 17, wherein the fourth length of the land is less than the fifth length of the first ramp and wherein the fourth length of the land is less than the sixth length of the second ramp.

19. The bearing claim 6, wherein the dam includes a radially extending wall.

20. The bearing of claim 6, wherein the open end is wider than the closed end.

\* \* \* \* \*